Oct. 5, 1965 E. M. LAU 3,210,493
BIN LEVEL SENSING DEVICE
Filed June 19, 1961 2 Sheets-Sheet 1

Inventor
Erwin M. Lau
By Zabel, Baker, York, Jones & Dithmar
Attorneys

Oct. 5, 1965  E. M. LAU  3,210,493
BIN LEVEL SENSING DEVICE
Filed June 19, 1961
2 Sheets-Sheet 2

Inventor:
Erwin M. Lau
By: Zahl, Baker, York,
Jones & Dithmar
Attorneys

United States Patent Office 3,210,493
Patented Oct. 5, 1965

3,210,493
BIN LEVEL SENSING DEVICE
Erwin M. Lau, Dolton, Ill., assignor to Black Products Co., Chicago, Ill., a corporation of Illinois
Filed June 19, 1961, Ser. No. 118,119
12 Claims. (Cl. 200—61.2)

This invention relates to a level responsive device of the stalling type.

It has heretofore been proposed to provide a level responsive means suitable for use in connection with powdered and granular materials which includes a paddle which is rotated on its axis by a motor. This device is mounted on the wall of a bin, with the paddle projecting into the bin. When the level of the powdered or granular material within the bin intereferes with the rotation of the paddle, the motor torque causes a displacement of the motor itself to operate a control switch.

In such a rotating paddle device considerable difficulty has been encountered in providing a satisfactory seal for the paddle shaft. When that device is used in connection with finely powdered materials, the powder or dust will seep into the shaft bearing and interefere with the operation of the device. More particularly, the dust clogs the bearing, or increases the friction, with the result that the increased bearing friction in itself will cause a stalling of the paddle. Then the level responsive device will be actuated even though the level of the material within the bin is nowhere near the paddle. In other words, increased bearing friction causes the level responsive device to lose sensitivity, and eventually to become totally inoperative to indicate the level of the material within the bin.

It is an object of the present invention to overcome this difficulty by providing a sensing element which moves in a circular path but does not rotate about its axis, and hence which does not require the use of a rotary type of seal between the parts.

According to my invention, the sensing element instead of being in the form of a rotating paddle, is in the form of a pivotally mounted lever which does not rotate on its axis. This arrangement permits the use of a positive type flexible seal, the term "positive" referring to an arrangement in which there is no rotating movement between the sealing element and the mechanical element at the point of contact, thus permitting a positive interlocking of the two at this point, or a positive connection of the sealing element to the mechanical element at the point of contact.

Another object of my invention is to provide an improved stalling arrangement which involves the use of a slip clutch instead of a stalling type of motor. This feature permits the use of a stronger motor.

Still another object is to provide a level responsive device which can be readily adjusted from the outside of the housing in order to regulate sensitivity of action.

Other objects, features and advantages of my invention will become apparent as the description proceeds.

In reference now to the drawings in which like reference numerals represent like parts:

Figure 1:
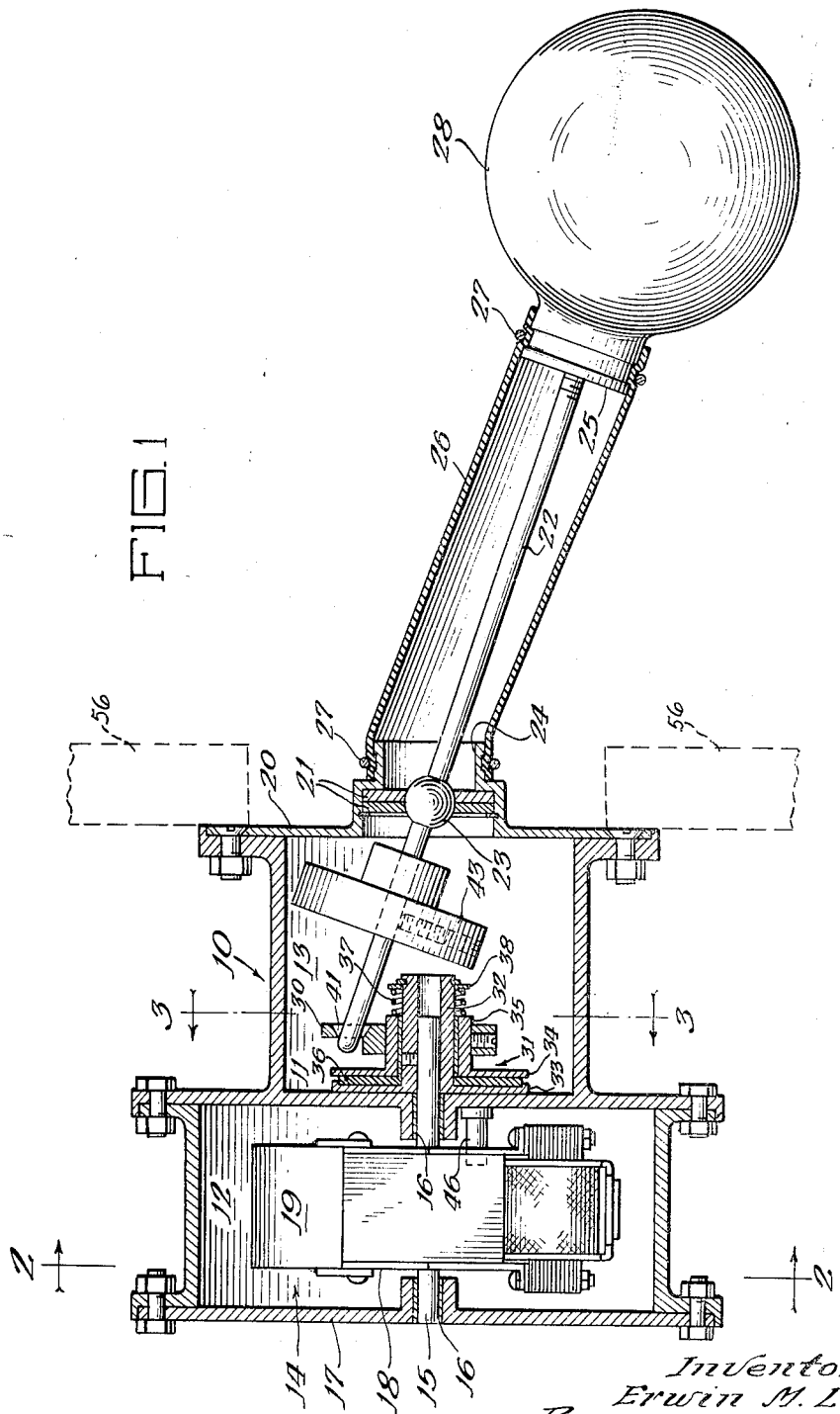
FIG. 1 is a sectional elevation showing a preferred embodiment of my invention.

The level responsive device includes a housing 10 which is separated by a wall 11 into two parts, one part comprising a motor compartment 12, and the other part comprising an arm receiving compartment 13.

A motor 14 is located in the motor compartment 12 and is preferably a low power geared synchronous motor, the armature shaft 15 of which rotates at a slow speed, such as from 1 to 10 revolutions per minute.

The armature shaft 15 is mounted in bearings 16 formed in the intermediate wall 11 and in the rear wall 17. The motor 14 is supported on its armature shaft, and includes a motor frame 18 and a counterweight 19 so that the motor is balanced with respect to the axis of the armature shaft. Thus, if the motor frame 18 is restrained from rotation, then the armature shaft 15 will rotate, and vice versa.

The front wall 20 of the housing 10 is provided with an opening in which are located a pair of bearing plates 21 providing a spherical socket. A sensing arm 22 extends through the bearing plates 21 and is provided with a spherical bearing 23 which provides a pivoted mounting for the arm 22 thus providing a fulcrum which permits universal movement. The bearing plates 21 are preferably of oilite so as to provide self lubrication. Thus the arm 22 may be oscillated back and forth in either a circular path or a linear path.

The front wall 20 is provided with a cylindrical flange 24, and the front portion of the arm 22 is provided with a collar 25, the flange and the collar both being grooved. A flexible sleeve 26, such as a rubber tube, surrounds the projecting portion of the arm 22 and is clamped to the flange 24 and the collar 25 by suitable clamping means 27, such as a ring. A ball 28 or similar device may be mounted at the outer end of the arm 22.

The ends of the flexible sleeve 26 are positively secured or connected to the arm and the housing respectively, thus providing a positive type seal which is impervious to dust, or to liquid, or to any other materials which may constitute the surrounding environment.

The arm 22 is oscillated in a circular path without imparting rotation thereto, the drive means including a crank type eccentric 30, and a clutch 31.

The clutch includes a sleeve 32 which is suitably keyed to the armature shaft 15, the sleeve including a disc-like driving member 33. The driven member 34 of the clutch is provided with a hub 35 which rides on the sleeve 32. A suitable clutch facing, such as a cork ring 36, may be interposed between the driving and driven members 33 and 34. The eccentric 30 is mounted on and keyed to the hub 35 of the driven member.

A spring 37 surrounds the driving member sleeve 32 and is confined between the hub 35 and a retaining washer 38 so that the spring urges the driven member 34 into engagement with the driving member 33.

Thus the eccentric 30 is driven through the clutch 31, and under certain conditions, as pointed out hereinafter the clutch introduces a slippage between the motor 14 and the arm 22.

Figure 3:
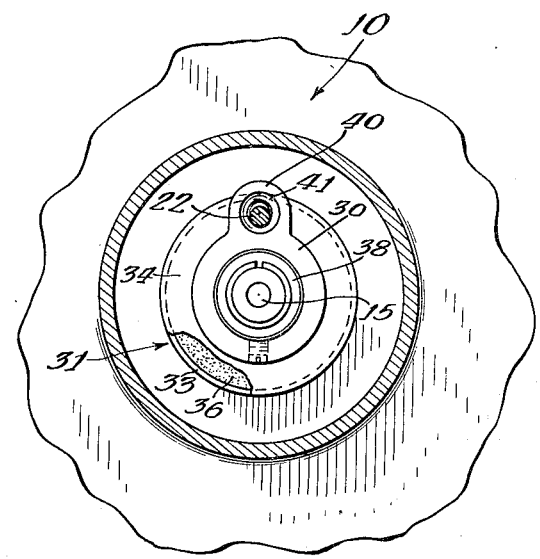
FIG. 3 is a vertical section taken along line 3—3 of FIG. 1.

As shown in FIG. 3, the eccentric 30 is in the form of a disc having a radial projecting lug 40 which is formed with a flared opening 41 therein. The inner end of the arm 22 is received within the flared opening 41. A counterweight 43 is preferably mounted on the arm 22 within the stick compartment 13 so as to reduce the load on the motor.

Thus, in normal operation, assuming that the motor frame 18 is restrained from rotation with respect to the housing 10, the arm 22 will be oscillated in a circular path, but the loose connection between the eccentric 30 and the arm does not cause the arm to rotate about its longitudinal axis. The construction of the flexible seal prevents rotation of the arm 22 about its longitudinal axis.

Mounted in the intermediate wall 11 are two stop pins 45 and 46 which project into the path of the motor frame 18 to permit rotational displacement of the motor frame through a small extent, such as one or two degrees. A microswitch 47 is mounted on the intermediate wall 11 and carries a bracket 48 upon which an arm 49 is pivotally mounted. The arm 49 overlies the plunger 50 of the microswitch and the outer end of the arm engages the motor frame 18. When the motor frame is rotated from its FIG. 2 position, so that it contacts the stop pin 46, the switch plunger 50 will be depressed to indicate the stalling of the arm 22. The motor frame is normally biased into contact with the stop pin 45 by means of a control spring 54 which bears against the arm 49.

A set screw 51 is suitably mounted in the wall 52 of the housing 10 and is provided with a collar 53. The control spring 54 is confined between the collar 53 and the pivoted arm 49. By adjusting the set screw 51, the amount of force required to rotate the motor frame 18 into its operated position can thus be regulated, and this can be done from the outside of the housing 10. A suitable jam nut 55 is provided for the set screw 51.

Figure 2:
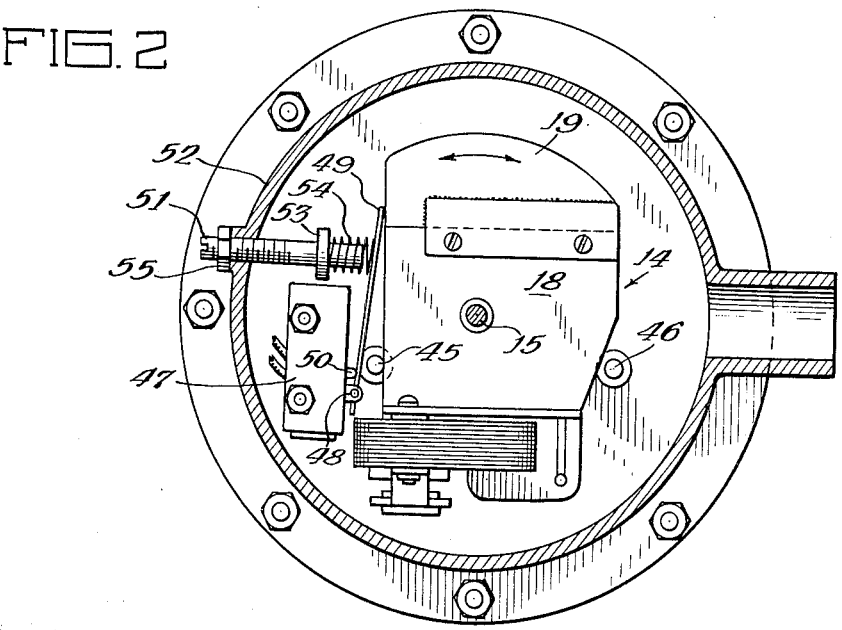
FIG. 2 is a vertical section taken along line 2—2 of FIG. 1.

In operation, when the level of the material interferes with the free movement of the ball 28, the arm 22 will be stalled, causing rocking of the motor frame 18 from its normal position, shown in FIG. 2, into the switch operated position. This causes an indication to be given that the level of the material in the bin or other container has reached a predetermined level. Further rotation of the motor is prevented by the stop pin 46, with the result that the clutch 31 slips.

When the material level has dropped, the arm 22 is again free for oscillating movement, and the control spring 54 thereupon rocks the motor back against the stop pin 45. Since the resistance to the oscillating motion of the arm 22 is less than the force exerted by the control spring 54, the parts will remain in the switch unoperated position until such time as the motion of the arm is again stalled.

By virtue of the fact that the motor is provided with a counterweight 19, and the sensing arm is provided with a counterweight 43, the level responsive device can be mounted on the side wall 56 of the bin, in which the sensing arm 22 projects generally horizontally, or the device can be mounted in a vertical position with the sensing arm projecting downwardly. Also, the device can be mounted at other angles, since the motor is urged into its normal position by the control spring 54 rather than by gravity.

In the arrangement shown herein, the sensing arm 22 is in the form of a wobble stick which provides a circular path for the end of the sensing element. The advantage of a circular path is that it is preferable to provide a movement of the sensing arm 22 or the ball 28 whereof at least a portion of the movement is horizontal or tangent thereto. This is for the reason that the stalling action is more positive if the movement of the sensing element is substantially horizontal at the point of stalling rather than vertical in which the element would dip up and down into the material the level of which is to be sensed. By providing a circular path, it is possible to obtain the desired substantially horizontal movement irrespective of whether the level responsive device is mounted horizontally as shown, or vertically, or at some intermediate angle. In other words, the combination of circular path and counterweighted mechanism provides a level responsive device which is of uniform applicability in all types of installations, whether horizontal or vertical.

Furthermore, the present invention, by virtue of the positive type seal provided, can be used with liquids, as well as with powders and granular materials. The resistance offered by the control spring 54 can be easily regulated in accordance with the viscosity of the liquid, the level of which is to be sensed, just as in the case of a powder or granular material, and as pointed out above, this regulation may be effected from the outside of the housing 10.

Although only a preferred embodiment of my invention has been shown and described herein, it will be understood that various modifications and changes may be made in the construction shown without departing from the spirit of my invention as pointed out in the appended claims.

I claim:

1. A level responsive device comprising a housing, a sensing arm extending through a wall of said housing, pivot means for pivotally mounting said arm in the wall of said housing, a flexible sleeve covering a projecting portion of said sensing arm and extending between said sensing arm and said housing wall and effecting a seal for said pivot means, driving means located within said housing for oscillating said arm in a circular path about said pivot means, said driving means comprising a motor having a motor frame and an armature shaft journaled therein, said armature shaft being also journaled in said housing and crank type eccentric means providing a driving connection between said armature shaft and said sensing arm which moves said arm in a circular path without rotating same about its axis, means for rotatably mounting said armature shaft with respect to said housing, said motor frame being supported by said armature shaft so as to permit relative movement between said motor frame and said housing whereby inability of said armature shaft to rotate with respect to said housing will cause rotation of said motor frame with respect to said housing, and switch means located adjacent to said motor frame for engagement thereby and actuated by rotation of said motor frame with respect to said housing, whereby a stalling of said sensing arm will cause rotation of said motor frame and actuation of said switch means.

2. A level responsive device as claimed in claim 1 including a control spring constructed and arranged to resist the rotation of said motor frame and located between said housing and said motor frame, and means extending through said housing for adjusting the tension of said control spring.

3. A level responsive device as claimed in claim 1 in which said pivot means comprises a spherical bearing for permitting movement of said sensing arm in a circular path.

4. A level responsive device as claimed in claim 1 in which said housing has an opening in the wall thereof, a pair of bearing plates disposed in said housing and providing a spherical socket, and in which said pivot means comprises a spherical bearing mounted on said sensing arm and cooperating with the spherical socket formed in said bearing plates.

5. A level responsive device as claimed in claim 1 in which said crank type eccentric means comprises a disk-like member driven by said armature shaft and having an eccentrically disposed opening formed therein, the inner end of said sensing arm extending into said opening and being loosely engaged thereby.

6. A level responsive device as claimed in claim 1 in which said driving means includes a slip clutch located between said armature shaft and said means for providing a driving connection.

7. A level responsive device comprising a housing, a sensing arm extending through a wall of said housing, pivot means for pivotally mounting said arm in the wall of said housing, non-rotatable sealing means for the external portion of said pivot means for effecting a seal between said housing wall and a portion of said sensing arm, driving means located within said housing for oscillating said arm about said pivot means, said driving means comprising a motor having a motor frame and an armature shaft journaled therein, and means providing a driving connection between said armature shaft and said sensing arm which oscillates said arm without rotating same about its axis, means for rotatably mounting said armature shaft with respect to said housing, said motor frame being supported by said armature shaft so as to permit relative movement between said motor frame and said housing whereby inability of said armature shaft to rotate with respect to said housing will cause rotation of said motor frame with respect to said housing, switch means located adjacent to said motor frame and actuated by rotation of said motor frame with respect to said housing, whereby a stalling of said sensing arm will cause rotation of said motor frame and actuation of said switch means, a stop pin mounted in said housing adjacent said motor frame for limiting rotation of said motor frame with respect to said housing when said armature shaft is unable to rotate due to the stalling of said sensing arm, and clutch means interposed between said armature shaft and said driving connection means in order to introduce a slippage in said driving means after said motor frame engages said stop pin.

8. In a level responsive device of the stalling type and including a housing, the combination of a sensing arm extending through a wall of said housing, pivot means for pivotally mounting said arm in the wall of said housing, a flexible member surrounding a projecting portion of said sensing arm and extending between said sensing arm and said housing wall and effecting a seal for said pivot means, and driving means located within said housing for moving said arm in a circular path about said pivot means, said driving means comprising a motor and crank type eccentric means providing a driving connection between said motor and said sensing arm which moves said arm in a circular path without rotating same about its axis.

9. In a level responsive device of the stalling type suitable for mounting in either the side wall or top wall of a bin and including a housing, the combination of a sensing arm extending through a wall of said housing and into said bin, means for pivotally mounting said arm in the wall of said housing for universal movement, a flexible sleeve surrounding the projecting portion of said sensing arm and non-rotatably secured at one end to said housing wall and at its other end to said sensing arm to provide a positive seal between said pivotal mounting means and the interior of said bin, and driving means located within said housing for moving said arm in a circular path without rotating same about its axis.

10. A level responsive device of the stalling type adapted for either vertical or horizontal installation comprising a housing, a sensing arm extending through a wall of said housing, spherical bearing means for pivotally mounting said arm in the wall of said housing, a flexible member surrounding a projecting portion of said sensing arm and extending between said sensing arm and said housing wall and effecting a seal for said bearing means, and driving means located within said housing for causing the outer end of said sensing arm to move in a circular path without rotating same about its axis, and switch means responsive to a stalling of said arm and actuated by the displacement of said driving means.

11. A level responsive device as claimed in claim 1 in which includes a counterweight located within said housing and mounted on said sensing arm.

12. A level responsive device as claimed in claim 1 which includes a counterweight mounted on said motor frame, said motor, motor frame and counterweight, comprising an assembly which is substantially balanced with respect to the axis of said armature shaft.

References Cited by the Examiner

UNITED STATES PATENTS

| 989,418 | 4/11 | Read | 74—86 |
|---|---|---|---|
| 2,116,075 | 5/38 | Lenhart | 200—61.21 |
| 2,528,963 | 11/50 | Looney | 74—86 |
| 2,680,298 | 6/54 | Obenshain | 73—290 |
| 2,717,941 | 9/55 | Steiner | 200—168 |
| 2,851,553 | 9/58 | Grostick | 200—61.21 |
| 2,963,201 | 12/60 | Westlin | 200—61.21 |

FOREIGN PATENTS 1,111,671  9/54  France.

BERNARD A. GILHEANY, *Primary Examiner.*

MAX L. LEVY, ROBERT K. SCHAEFER, *Examiners.*